(12) United States Patent
Bull et al.

(10) Patent No.: US 8,548,925 B2
(45) Date of Patent: Oct. 1, 2013

(54) MONITORING CAPABILITIES FOR MOBILE ELECTRONIC DEVICES

(75) Inventors: William E. Bull, Campbell, CA (US); Policarpo Wood, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1290 days.

(21) Appl. No.: 12/014,552

(22) Filed: Jan. 15, 2008

(65) Prior Publication Data

US 2009/0182597 A1    Jul. 16, 2009

(51) Int. Cl.
*G06Q 40/00* (2012.01)

(52) U.S. Cl.
USPC .............................. 705/67; 235/379; 235/380

(58) Field of Classification Search
USPC .................................. 705/67; 235/379, 380
See application file for complete search history.

(56) References Cited

U.S. PATENT DOCUMENTS

| | | | |
|---|---|---|---|
| 5,379,057 A | 1/1995 | Clough et al. |
| 5,675,362 A | 10/1997 | Clough et al. |
| 6,091,956 A | 7/2000 | Hollenberg |
| 6,356,761 B1 | 3/2002 | Huttunen et al. |
| 6,496,857 B1 | 12/2002 | Dustin et al. |
| 6,836,667 B1 | 12/2004 | Smith |
| 7,647,166 B1 | 1/2010 | Kerns |
| 2001/0030660 A1 | 10/2001 | Zainoulline |
| 2002/0077897 A1 | 6/2002 | Zellner et al. |
| 2002/0085025 A1 | 7/2002 | Busis et al. |
| 2002/0102993 A1 | 8/2002 | Hendrey et al. |
| 2002/0123373 A1 | 9/2002 | Kirbas et al. |
| 2002/0152179 A1* | 10/2002 | Racov .............................. 705/67 |
| 2003/0110094 A1 | 6/2003 | Gulliver et al. |
| 2004/0044566 A1 | 3/2004 | Bostelmann et al. |
| 2004/0169683 A1 | 9/2004 | Chiu et al. |
| 2005/0091118 A1 | 4/2005 | Fano |
| 2005/0221841 A1 | 10/2005 | Piccionelli et al. |
| 2006/0031126 A1 | 2/2006 | Ma et al. |
| 2007/0214182 A1 | 9/2007 | Rosenberg |
| 2007/0299737 A1 | 12/2007 | Plastina et al. |
| 2008/0032719 A1 | 2/2008 | Rosenberg |
| 2009/0043667 A1 | 2/2009 | DeYoe et al. |
| 2009/0063293 A1 | 3/2009 | Mirrashidi et al. |
| 2010/0161400 A1 | 6/2010 | Snodgrass et al. |

FOREIGN PATENT DOCUMENTS

EP    1 168 879 A    1/2002

OTHER PUBLICATIONS

Tam et al., "Digits", Wall Street Journal, (Eastern edition), Aug. 10, 2003, 3 pgs.

* cited by examiner

*Primary Examiner* — Daniel Felten
(74) *Attorney, Agent, or Firm* — Kilpatrick Townsend & Stockton LLP

(57) ABSTRACT

Improved computer-implemented techniques for providing relevant information to mobile electronic devices are disclosed. According to one aspect, usage of mobile electronic devices can be monitored and usage data can be formed. The usage data can then be used to perform an action. The action can operate to provide more relevant information, such as digital (e.g., online) information or rewards, to the user. In one embodiment, usage of mobile electronic devices can be monitored and users of such mobile electronic devices can be provided with rewards based on their usage. Another aspect pertains to monitoring locations of a mobile electronic device for a duration of time and then providing location-specific information based on the locations of the device.

29 Claims, 13 Drawing Sheets

MONITORING CAPABILITIES FOR MOBILE ELECTRONIC DEVICES

BACKGROUND OF THE INVENTION

1. Field of the Invention

The present invention relates to mobile electronic devices and, more particularly, to usage or location monitoring of mobile electronic devices.

2. Description of the Related Art

Many people carry at least one mobile electronic device every day and through out the day. These mobile electronic devices tend to be very important digital tools or companions for users. Examples of some common mobile electronic devices are Personal Digital Assistants (PDAs), digital media players, mobile phones, and portable computers.

Today, merchants can track customer buying patterns. If customers make purchases during their visits using a "loyalty card" (or loyalty number), then the merchants can track purchases by customers. Using a loyalty card, a user can receive a discount or other reward for repeated purchases with a particular merchant. Also, conventionally, use of a particular credit card for a purchase made at a particular merchant can also facilitate monitoring customer buying patterns. However, when no purchases are made, merchants generally have no understanding of who are visiting their stores and how often. As a result, in many instances, merchants are not able to reward its repeat patrons.

Also, today, users of network browsers can configure their access webpage (e.g., "MyYahoo" provided by Yahoo! Inc.) for a network browser application (e.g., Safari™ application from Apple Inc.) to be presented with information of interest. However, configured preferences or settings that are used to determine the content for the webpage are fixed; hence, the characteristics for the webpage are fixed until subsequently changed through user interaction to alter the preferences or settings.

SUMMARY OF THE INVENTION

The invention pertains to computer-implemented techniques for providing relevant information to mobile electronic devices. According to one aspect, usage of mobile electronic devices can be monitored and usage data can be formed. The usage data can then be used to perform an action. The action can operate to provide more relevant information, such as digital (e.g., online) information or rewards, to the user. In one embodiment, usage of mobile electronic devices can be monitored and users of such mobile electronic devices can be provided with rewards based on their usage. Another aspect of the invention pertains to monitoring locations of a mobile electronic device for a duration of time and then providing location-specific information based on the locations of the device.

The invention can be implemented in numerous ways, including as a method, system, device, or apparatus (including graphical user interface and computer readable medium). Several embodiments of the invention are discussed below.

As a method for providing patrons with rewards, one embodiment of the invention includes at least the acts of: detecting presence of a mobile electronic device at a particular establishment; updating a presence indicator regarding the particular establishment if the presence of the mobile electronic device at the particular establishment is detected; obtaining one or more reward rules associated with the particular establishment; and determining whether a reward is due to the mobile electronic device or its user based on presence indicator and the one or more reward rules.

As a method for rewarding patrons for device usage at particular locations, one embodiment of the invention includes at least the acts of: monitoring device usage to accumulate device usage information; determining whether a reward is due based on the accumulated device usage information; and delivering a reward to the device or its user if it is determined that a reward is due.

As a method for providing location-based information to an electronic device, one embodiment of the invention includes at least the acts of: monitoring a location of a mobile device; determining location-based information that is related to the monitored location of the mobile device; and providing the location-based information to the electronic device.

As a method for acquiring location-specific information, one embodiment of the invention includes at least the acts of: detecting connection of a mobile device to a host computer; transferring, to the host computer, a set of locations that the mobile device has visited; sending the set of locations from the host computer to a remote information server; receiving, at the host computer, the location-specific information from the remote information server, the location-specific information being determined based at least in part on the set of locations; and sending at least a portion of the location-specific information from the host computer to the mobile device.

As a method for accessing location-based information, one embodiment of the invention includes at least the acts of: monitoring a location of a mobile device associated with a user; storing multiple locations of the mobile device provided by the monitoring over a period of time; subsequently connecting the mobile device with a host device; transferring, following the connection, the multiple locations from the mobile device to the host computer; determining digital information that is related to one or more of the multiple locations of the mobile device by analyzing the multiple locations of the mobile device; and facilitating access to the determined digital information.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to computer-implemented techniques for providing relevant information to mobile electronic devices. According to one aspect, usage of mobile electronic devices can be monitored and usage data can be formed. The usage data can then be used to perform an action. The action can operate to provide more relevant information, such as digital (e.g., online) information or rewards, to the user. In one embodiment, usage of mobile electronic devices can be monitored and users of such mobile electronic devices can be provided with rewards based on their usage. Another aspect of the invention pertains to monitoring locations of a mobile electronic device for a duration of time and then providing location-specific information based on the locations of the device.

Embodiments of the invention are discussed below with reference to FIGS. 1-13. However, those skilled in the art will readily appreciate that the detailed description given herein with respect to these figures is for explanatory purposes as the invention extends beyond these limited embodiments.

According to one aspect, usage of mobile electronic devices can be monitored and usage data can be formed. The usage data can then be used to perform an action. The action can operate to provide more relevant information, such as online information or rewards, to the user. In one embodiment, usage of mobile electronic devices can be monitored and users of such mobile electronic devices can be provided with rewards based on their usage.

Figure 1:
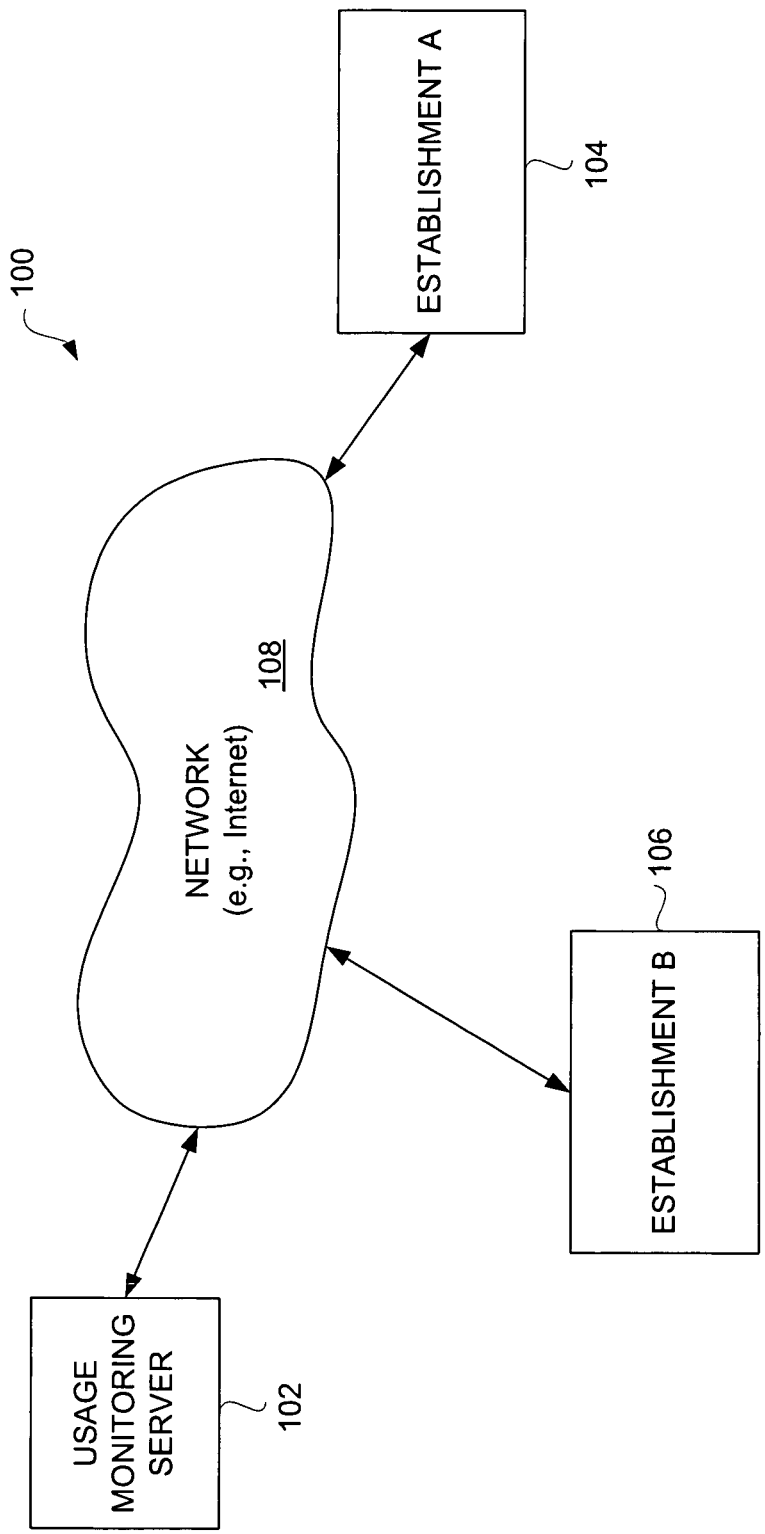
FIG. 1 is a usage monitoring system according to one embodiment of the invention.

FIG. 1 is a usage monitoring system 100 according to one embodiment of the invention. The usage monitoring system 100 includes a usage monitoring server 102 that monitors usage at a plurality of establishments. As illustrated in FIG. 1, an establishment A 104 and an establishment B 106 are illustrated as representative establishments. The establishments 104 and 106 can pertain the same organization or different organizations. As users with mobile devices visit the establishments 104 and 106, the usage monitoring server 102 receives information on the usage of the mobile devices at particular establishments. The usage monitoring server 102 can record such usage information. Additionally, the usage information can be examined for variety purposes. In one implementation, the usage information can be evaluated to determine whether a reward (i.e., some sort of benefit) is to be awarded to the users of the mobile devices. In another implementation, the usage information can be analyzed to profile the users so that more relevant information (e.g., digital information) can be provided to the users.

Establishments can participate in mutually beneficial arrangements to monitor usage of mobile electronic devices. Establishments are physical locations of organizations or businesses. One common establishment is a retail store. Examples of establishments include coffee/tea shops, new stands, gyms, electronics stores, media stores, food service stores, sporting goods stores, bars, etc. A group of organizations or businesses, such as those that are closely proximate to one another, can also effectively be grouped into a group establishment. For example, business tenants in a shopping mall can form a group establishment. In one implementation, the shopping mall can provide electronic equipment to monitor electronic device usage within the shopping mall.

Figure 2:
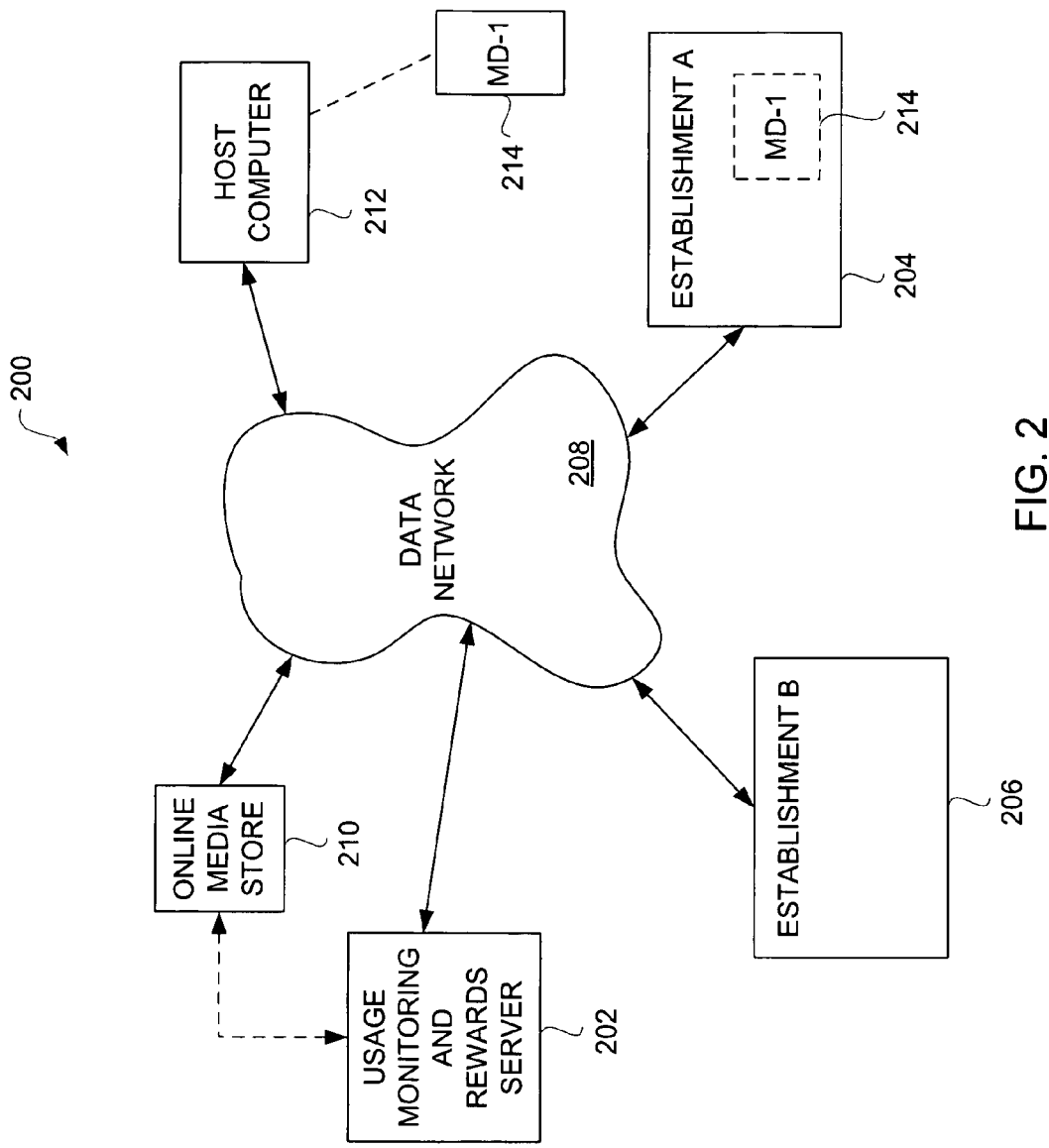
FIG. 2 is a block diagram of a usage monitoring system according to another embodiment of the invention.

FIG. 2 is a block diagram of a usage monitoring system 200 according to another embodiment of the invention. The usage monitoring system 200 includes a usage monitoring and rewards server 202. The usage monitoring system 200 also includes or couples to a plurality of establishments, including establishment A 204 and establishment B 206 as illustrated in FIG. 2. The usage monitoring and rewards server 202 can communicate with networking equipment resident at the establishments by way of a data network 208. The data network 208 can include one or more networks, whether wired or wireless, that are able to transmit data. The usage monitoring system 200 also includes or couples (directly or indirectly) to an online media store 210 that permits network access to the online media store 210 so that media items can be searched, browsed, previewed, rented or purchased. The usage monitoring system 200 can also couple to a host computer 212. The host computer 212 is typically associated with a particular user that has a mobile device, such as mobile device (MD-1) 214. As one example, the host computer 212 can pertain to a personal computer and the mobile device 214 is a mobile telephone or a personal digital assistant with network access capabilities.

The user, together with the mobile device 214, can move about to various locations. In doing so, the mobile device 214 can be caused to visit the establishment A 204. When this occurs, the networking equipment resident at the establishment A 204 can detect usage (e.g., presence) of the mobile device 214 at the establishment A 204. After detecting such usage, the networking equipment can signal the usage monitoring and rewards server 202 that the mobile device 214 (and thus its user) is currently located at the establishment A 204. Alternatively, the mobile device 214 could include a location determining module (e.g., a global positioning system (GPS) receiver) to detect usage (e.g., presence) of the mobile device 214 at the establishment A 204.

The usage monitoring and rewards server 202 can track such mobile device usage over time. For example, if the mobile device 214 often frequents the establishment A 204, the usage monitoring and rewards server 202 will understand that the mobile device 214 is a frequent visitor to the establishment A 204. As such, the usage monitoring and rewards server 202 can cause a reward to be made available to the mobile device 214 or its user. For example, if the mobile device 214 visits the establishment A 204 five times in a given month, the usage monitoring and rewards server 202 could cause in the mobile device 214 or its user to receive a reward. Examples of rewards can include a rebate, coupon, gift card, store credit, free item, free service, etc. The reward can be associated with a particular establishment or could be associated with the online media store 210, regardless of whether the online media stored 210 has any direct association with the establishment A 204.

The reward can be provided to the mobile device 214 or its user in any of various different ways. In one embodiment, the reward can be transmitted, and thus electrically (digitally) delivered, to the mobile device 214 while the mobile device 214 is at the establishment A 204 because the establishment A 204 can offer network connectivity to the data network 208 to the mobile device 214. For example, the establishment A 204 can provide WiFi access to the online media store 210 via the data network 208. Here, the mobile device 214 can receive the reward while still at the establishment A 204 or at a subsequent visit to the establishment A 204 (or an affiliated establishment/location). Alternatively, in another embodiment, the reward can be made available to the host computer 212 that is associated with the user of the mobile device 214. The reward can be transmitted to the host computer 212. Further, at a suitable time, the reward can be printed or electronically transferred (e.g., downloaded) from the host computer 212 to the mobile device 214. In still another embodiment, the reward can be delivered to the mobile device 214 and stored (e.g., cached) therein until the mobile device later visits (e.g., next visit) to the establishment A 204 at which time the reward can be presented to the user or the user can be altered as to the reward.

Figure 3:
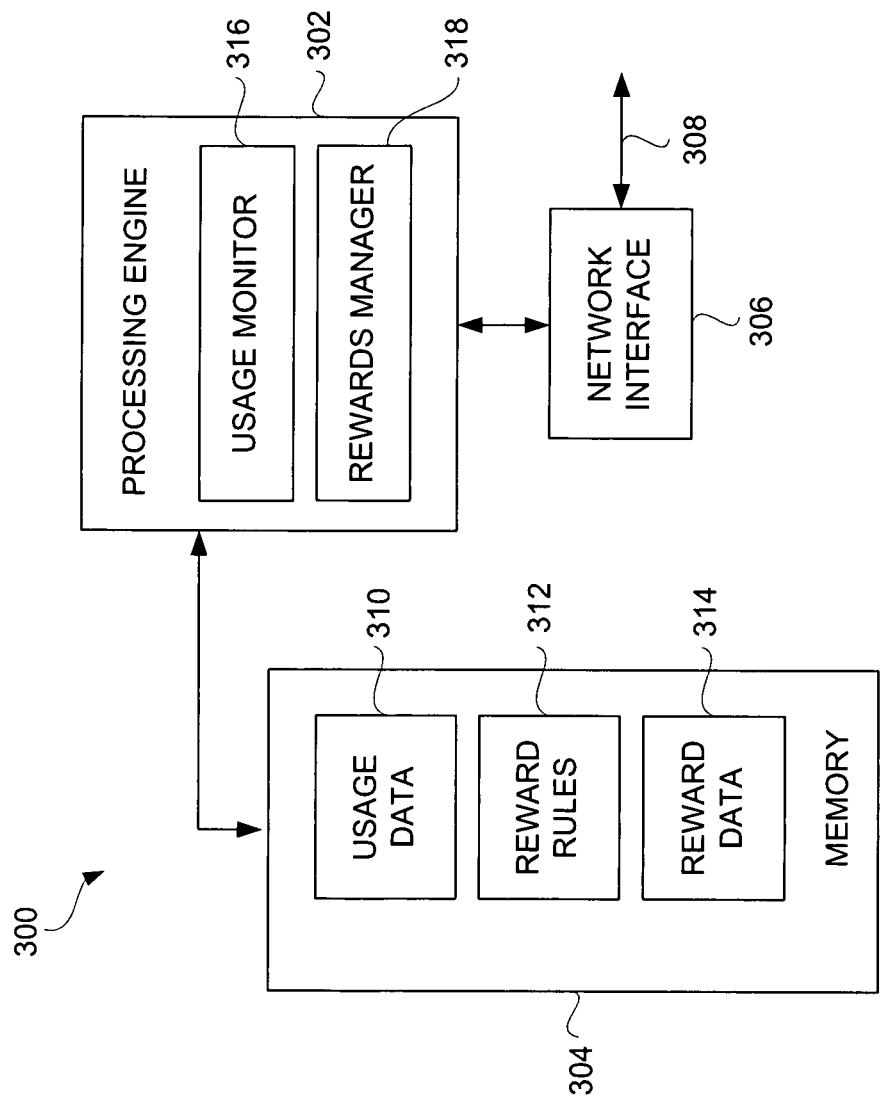
FIG. 3 is a block diagram of a usage monitoring and rewards server according to one embodiment of the invention.

FIG. 3 is a block diagram of a usage monitoring and rewards server 300 according to one embodiment of the invention. The usage monitoring and rewards server 300 is, for example, suitable for use as the usage monitoring and rewards server 202 illustrated in FIG. 2.

The usage monitoring and rewards server 300 includes a processing engine 302, a memory 304 and a network interface 306. The network interface 306 can include a link 308 that is suitable for coupling the usage monitoring and rewards server 300 to a data network, such as the data network 208 illustrated in FIG. 2. The memory 304 can provide data storage for the usage monitoring and rewards server 300. The data being stored in the memory 304 can, for example, include usage data 310, rewards rules 312 and reward data 314. The usage data 310 can include usage information regarding various devices. For example, in one embodiment, the usage data can include counts of the number of times that particular mobile devices had visited particular establishments (or locations). In another embodiment, the usage data 310 can include locations and times that particular mobile devices visited particular establishments (or locations). The reward rules 312 provide conditional rules that can be evaluated based on the usage data 310. If and when a conditional aspect of a given reward rule is satisfied, a particular reward is made available to the associated mobile device (or its user). The reward data 314 can provide information on the rewards that are available and/or can include information regarding rewards that are available to particular mobile devices (or their users).

Frequency of use can be monitored generally across a group of locations or individual locations. One particular type of frequency of use that can be monitored is how often a mobile device user visits a location. As noted above, the locations can pertain to establishments, such as stores. Rules, or reward rules, can specify a reward available to a mobile device user. In one embodiment, the greater the frequency of use the greater the available reward.

Table I below provides an example of rules for rewards based on monthly visits to a location. In this example, the more frequent a user visits a location (e.g., a store) in a given month, the better the reward available to the user. In one implementation, the rewards are associated with a location, such as an establishment being visited. In another implementation, the rewards are associated with an online media store, such as the online media store 210.

TABLE I

| # Visits/Month | Available Reward |
|---|---|
| 5 | 1 Free Download |
| 10 | 1 Free Rental |
| 15 | $10 Gift Card |
| 30 | $20 Gift Card |

Figure 4:
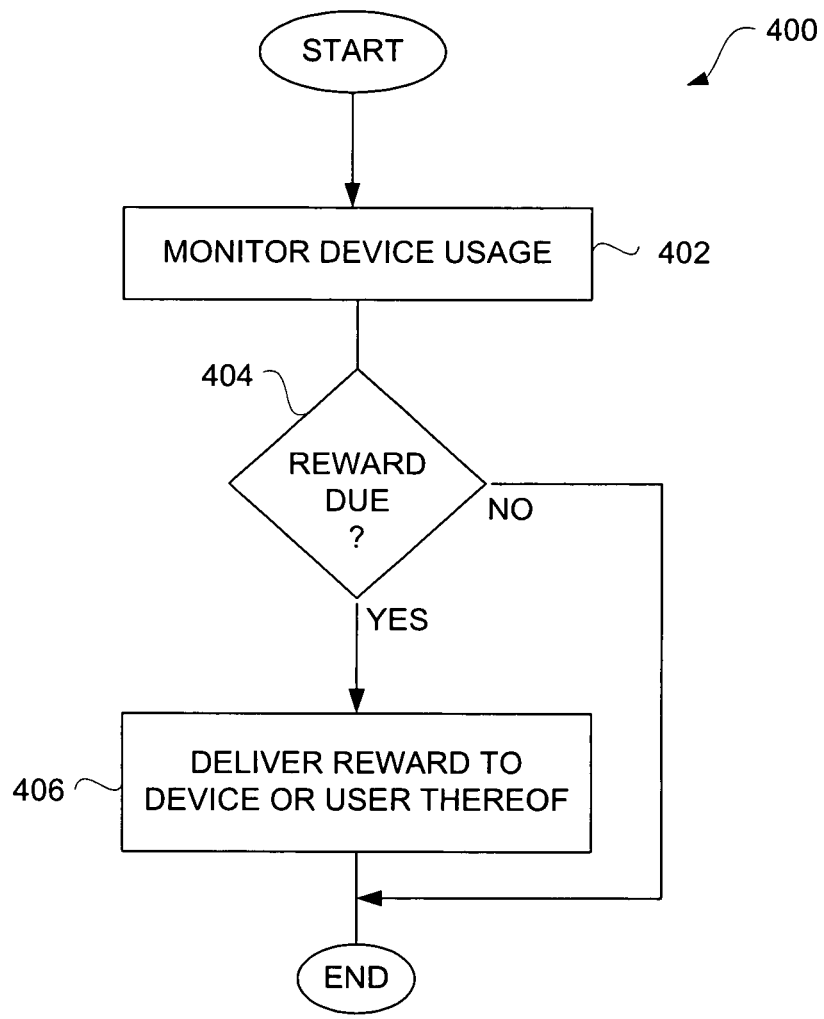
FIG. 4 is a flow diagram of a usage and reward process according to one embodiment of the invention.

FIG. 4 is a flow diagram of a usage and reward process 400 according to one embodiment of the invention. The usage and reward process 400 is, for example, performed by a usage monitoring server, such as the usage monitoring server 102 illustrated in FIG. 1, or a usage monitoring and rewards server, such as the usage monitoring and rewards server 202 illustrated in FIG. 2.

The usage and reward process 400 monitors 402 device usage. Typically, the usage and reward process 400 monitors a plurality of devices. The devices are mobile electronic devices, such as personal digital assistants, mobile telephones, portable computers and the like. In one embodiment, the monitoring 402 of device usage concerns monitoring device usage while the device is at a location, such as an establishment.

The usage and reward process 400 can also include a decision 404. The decision 404 can determine whether a reward is due to a particular mobile device or its user. As discussed in more detail below, a reward can represent a wide variety of different types of benefits being offered to patrons of a location (establishment). For example, the notification of the reward can pertain to a coupon (physical or electronic) that can be later shown to a merchant to receive the reward (e.g., discount). When the decision 404 determines that a reward is due to a particular mobile device or its user, a reward can be delivered 406 to the device or its user. In one implementation, the reward is electronically transmitted to the mobile device. In another implementation, the user of the mobile device can be notified of the reward and the delivery of the reward to the user or the mobile device can be performed electronically or physically. In still another implementation, the delivery of the reward can be deferred until the user or the mobile device subsequently visits the same (or an affiliated) location. On the other hand, when the decision 404 determines that a reward is not due to a particular mobile device or its user, the block 406 of the usage and reward process 400 can be bypassed. Following the block 406, or it being bypassed, the usage and reward process 410 can end.

Figure 5:
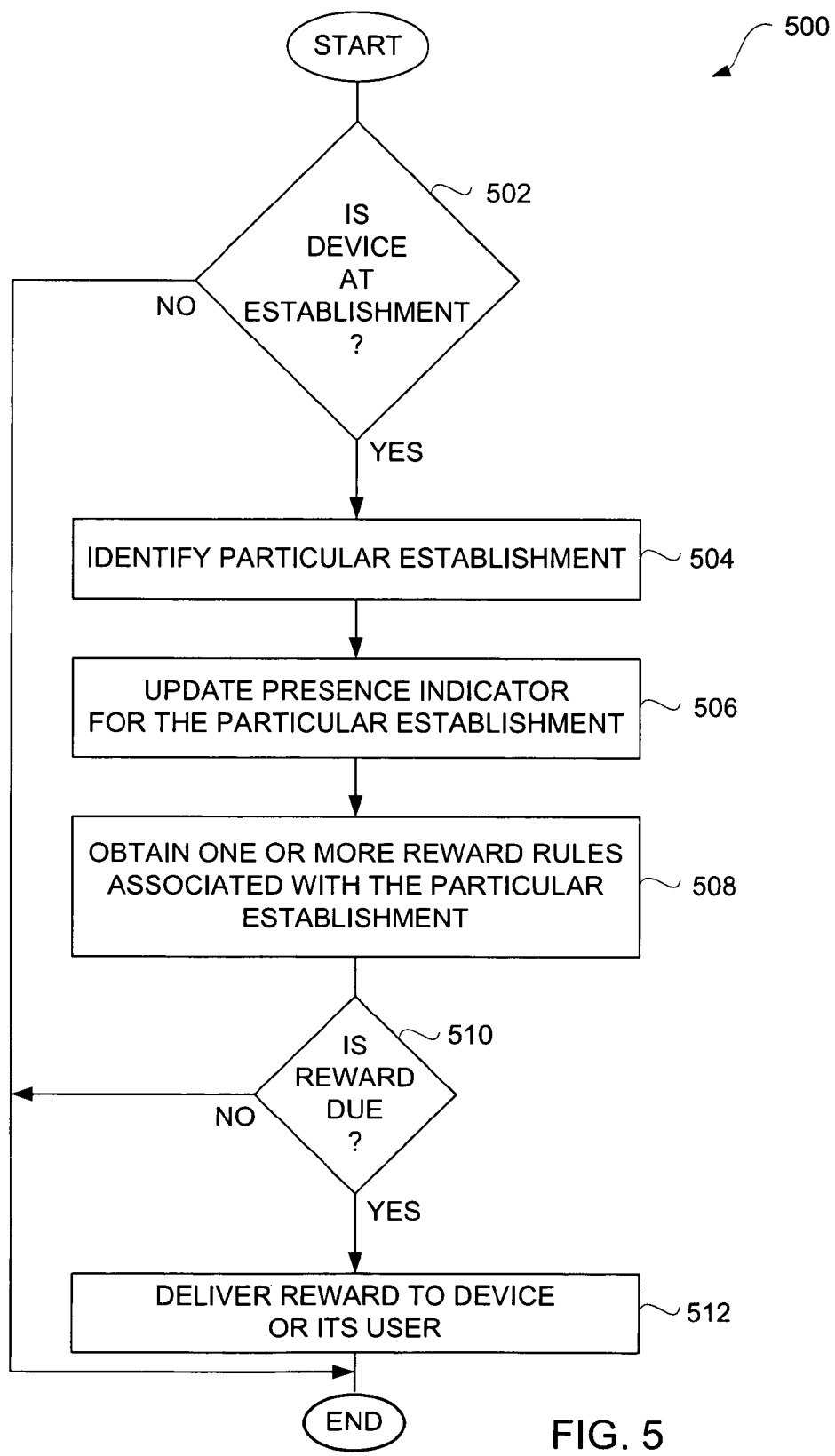
FIG. 5 is a flow diagram of a usage and reward process according to another embodiment of the invention.

FIG. 5 is a flow diagram of a usage and reward process 500 according to another embodiment of the invention. The usage and reward process 500 is, for example, performed by a usage monitoring server, such as the usage monitoring server 102 illustrated in FIG. 1, or a usage monitoring and rewards server, such as the usage monitoring and rewards server 202 illustrated in FIG. 2.

The usage and reward process 500 can begin with a decision 502. The decision 502 can determine whether a device, namely a mobile device, is at an establishment. Here, the device usage is monitored while the device is at an establishment. For example, how frequent a device is at an establishment can be used in determining whether a reward is to be provided.

When the decision 502 determines that the device is at an establishment, a particular establishment can be identified at 504. Next, a presence indicator for the particular establishment can be updated 506. In addition, one or more reward rules associated with the particular establishment can be obtained 508.

Next, a decision 510 determines whether a reward is due to the device or its user. The decision 510 can utilize the presence indicator and the reward riles to determine whether a reward is due. When the decision 510 determines that a reward is due, the reward can be delivered 512 to the device or its user. The delivery of the reward can be immediate or deferred. Following the block 512, the usage and reward process 500 can end.

In addition, when the decision 502 determines that the device is not at an establishment, the blocks 504-512 can be bypassed such that the usage and reward process 500 can directly end. Alternatively, when the decision 502 determines that the device is not at an establishment, the usage and reward process 500 can either await being at the establishment or be deemed not invoked. Also, when the decision 510 determines that a reward is not due, the usage and reward process 500 can bypass the block 512 and end.

The usage and reward process 500 can be performed for various mobile devices as their users visit establishments providing usage monitoring. In one embodiment, the usage and reward process 500 can be periodically repeated or otherwise invoked to provide near continuous monitoring for devices at establishments.

Figure 6:
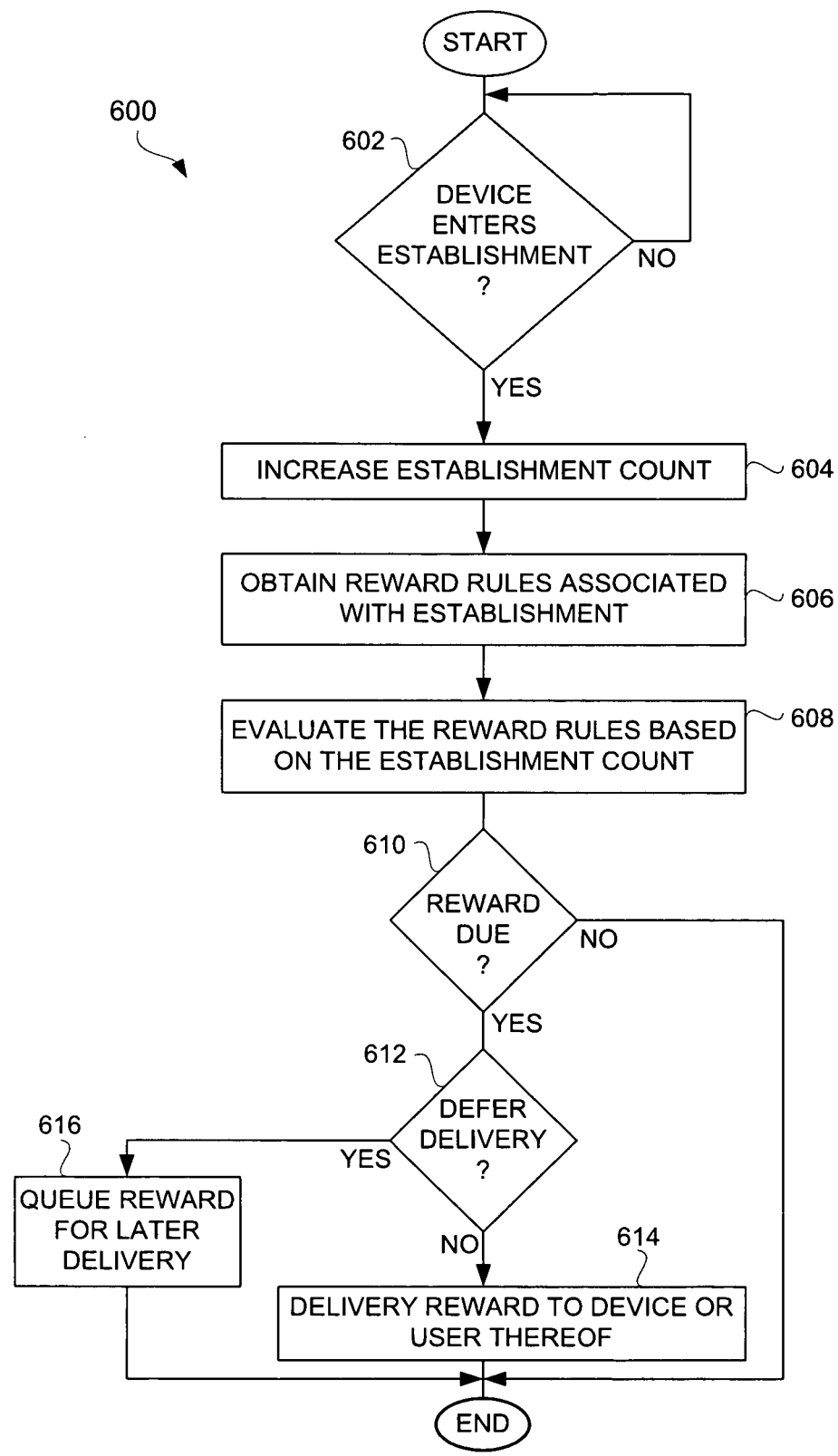
FIG. 6 is a flow diagram of a usage and reward process according to another embodiment of the invention.

FIG. 6 is a flow diagram of a usage and reward process 600 according to another embodiment of the invention. The usage and reward process 600 is, for example, performed by a usage monitoring server, such as the usage monitoring server 102 illustrated in FIG. 1, or a usage monitoring and rewards server, such as the usage monitoring and rewards server 202 illustrated in FIG. 2.

The usage and reward process 600 can begin with a decision 602. A decision 602 determines whether a device has entered an establishment. Here, according to one embodiment, it is assumed that the establishment is participating with the usage monitoring server or usage monitoring and reward server to provide local wireless infrastructure to sense usage (e.g., presence) of mobile devices at the establishment. In one embodiment, the establishments and one or more remote servers (e.g., the usage monitoring server or the usage monitoring and reward server) have a mutually beneficial arrangement to monitor device usage. When the decision 602 determines that a device has not entered an establishment, the usage and reward process 600 can await the determination that a device has entered an establishment. In other words, the usage and rewards process 600 can continuously, periodically or on-demand perform the usage and reward process 600.

When the decision 602 determines that a device has entered an establishment, an establishment count associated with the device (or the device user) can be increased. Here, in this embodiment, the establishment count represents the number of times that the device (or the device user) has entered (e.g., visited) the establishment. To control the count, limits can be placed on (i) the number of times per day that the establishment count can be increased (maximum daily count increase), or (ii) how frequently the count can be increased.

Next, reward rules associated with the establishment are obtained 606. The reward rules are rules that can be provided by or associated with the establishment to specify rules that determine whether the user of a particular mobile device is eligible to receive a reward. The reward rules can also specify the particular reward to be provided to the user of the particular mobile device. The reward rules can then be evaluated 608 based on the establishment count.

A decision 610 can then determine whether a reward is due. When the decision 610 determines that a reward is due based on the evaluation 608 of the reward rules, a decision 612 can determine whether delivery of the reward should be deferred. When the decision 612 determines that delivery of the reward is not to be deferred, the reward can be delivered 614 to the device or the user thereof. Alternatively, when the decision 612 determines that the reward is to be deferred, the reward can be queued 616 for later delivery. Following the blocks 614 and 616, the usage and reward process 600 can end. In addition, following the decision 610 when the decision 610 determines that a reward is not due, the usage and reward process 600 can also end.

Figure 7:
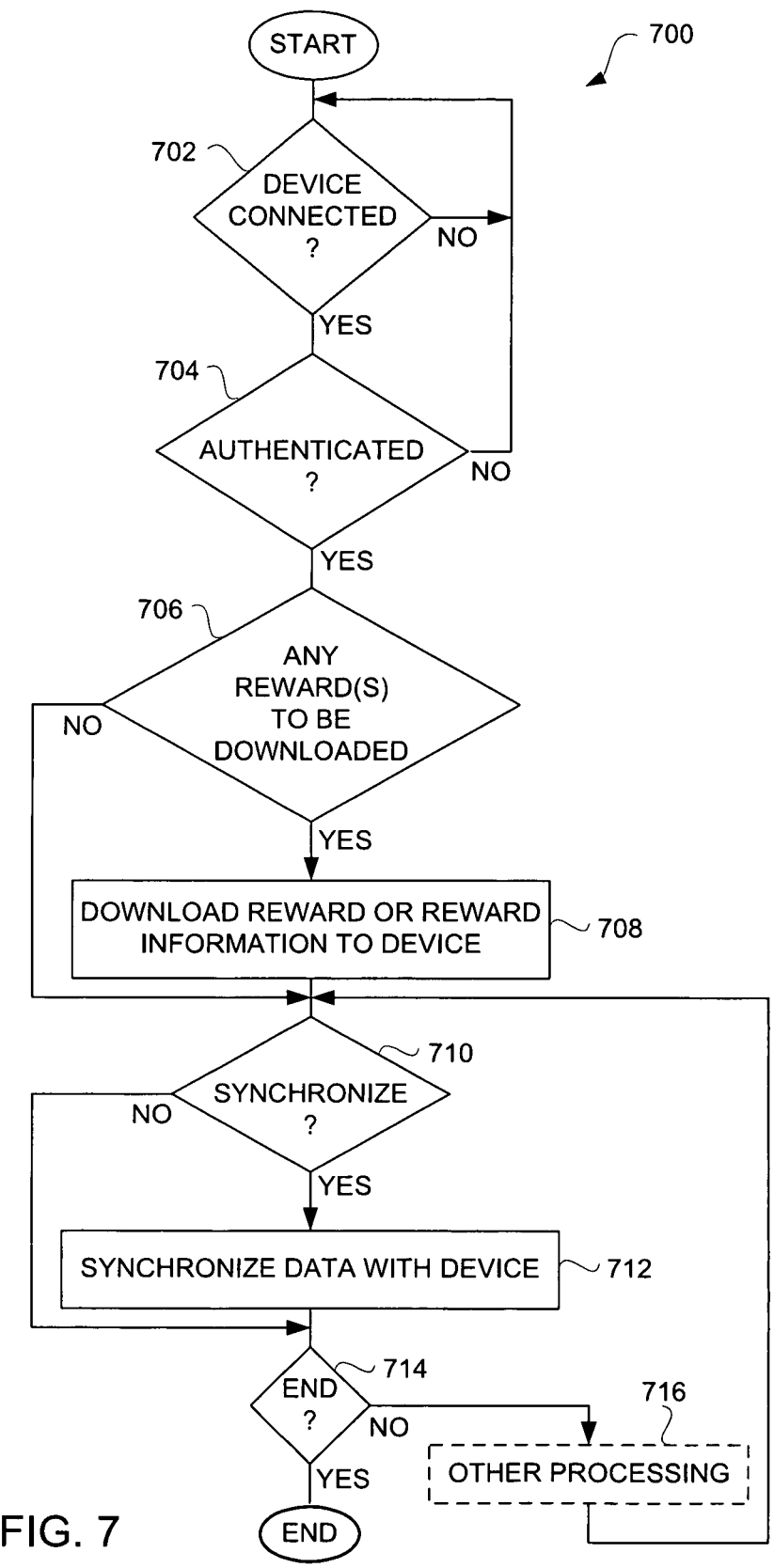
FIG. 7 is a flow diagram of a deferred reward delivery process according to one embodiment of the invention.

FIG. 7 is a flow diagram of a deferred reward delivery process 700 according to one embodiment of the invention. The deferred reward delivery process 700 is, for example, performed by a host computer, such as the host computer 212 illustrated in FIG. 1. However, the deferred reward delivery process 700 can also be performed by a server, such as the usage monitoring server illustrated in FIG. 1 or the usage monitoring and rewards server 202 illustrated in FIG. 2.

The deferred reward delivery process 700 can begin with a decision 702 that determines whether a device, namely, a mobile device, is connected. Here, the decision 702 determines whether a mobile device is connected, wirelessly or wired, to the host computer. When the decision 702 determines that the mobile device is not connected to the host computer, the deferred reward delivery process 700 can wait for the presence of the connection. Alternatively, once the decision 702 determines that the mobile device is connected to the host device, a decision 704 can determine whether the mobile phone has been authenticated 704. When the decision 704 determines that the mobile device has not been authenticated, the deferred reward delivery process 700 can return to repeat the decision 702 such that only authentic mobile devices can be used. Authentication can be provided by the mobile device itself and/or provided by user input with respect to the mobile device.

On the other hand, when the decision 704 determines that the mobile device has been authenticated, a decision 706 can determine whether there are any rewards to be downloaded from the host computer to the mobile device. Although the rewards can be electronic and thus downloadable to the host computer, in one implementation reward information is downloaded and then used to acquire the reward, either electronically or physically. When the decision 706 determines that there are one or more rewards to be downloaded to the mobile device, the reward (or reward information) can be downloaded 708 to the device. Alternatively, when the decision 706 determines that there are no rewards to be downloaded, the block 708 can be bypassed.

Following the block 708 or its being bypassed, a decision 710 can determine whether synchronization has been performed for the mobile device and the host device. When the decision 710 determines that synchronization is to be performed, data within the mobile device can be synchronized 712 with data residing on or accessible to the host computer. When the decision 710 determines that synchronization is not to be performed, the block 712 can be bypassed. Following the block 712, or its being bypassed, a decision 714 determines whether the deferred reward delivery process 700 should end. When the decision 714 determines that the deferred reward delivery process 700 should not end, the deferred reward delivery process 700 can optionally perform other processing 716. Thereafter, the deferred reward delivery process 700 can return to repeat the decision 710 and subsequent operations. Alternatively, when the decision 714 determines that the deferred reward delivery process 700 should end, then the deferred reward delivery process 700 can end.

In an alternative embodiment, a reward (or reward information) can be transmitted (e.g., downloaded) to a host computer. Then, if desired, the reward (or reward information) can be transferred (e.g., during a synchronization operation) from the host computer to a mobile device.

In another embodiment, a user of the mobile device can be notified that they are eligible for a reward based on their usage. The notification can inform the user what the reward is and either provide the reward or provide information on how to retrieve the award. The notification can be electronically transmitted to the mobile device or some other device, such as a personal computer. The user can, for example, retrieve the reward from the mobile device or the personal computer.

Another aspect of the invention pertains to monitoring locations of a mobile electronic device for a duration of time and then providing location-specific information based on the location of the device. The determination of locations of the mobile electronic device can be performed by the mobile device itself or by a network system. The location-specific information can be provided by a remote server via a network to a host computer or a mobile electronic device.

Figure 8:
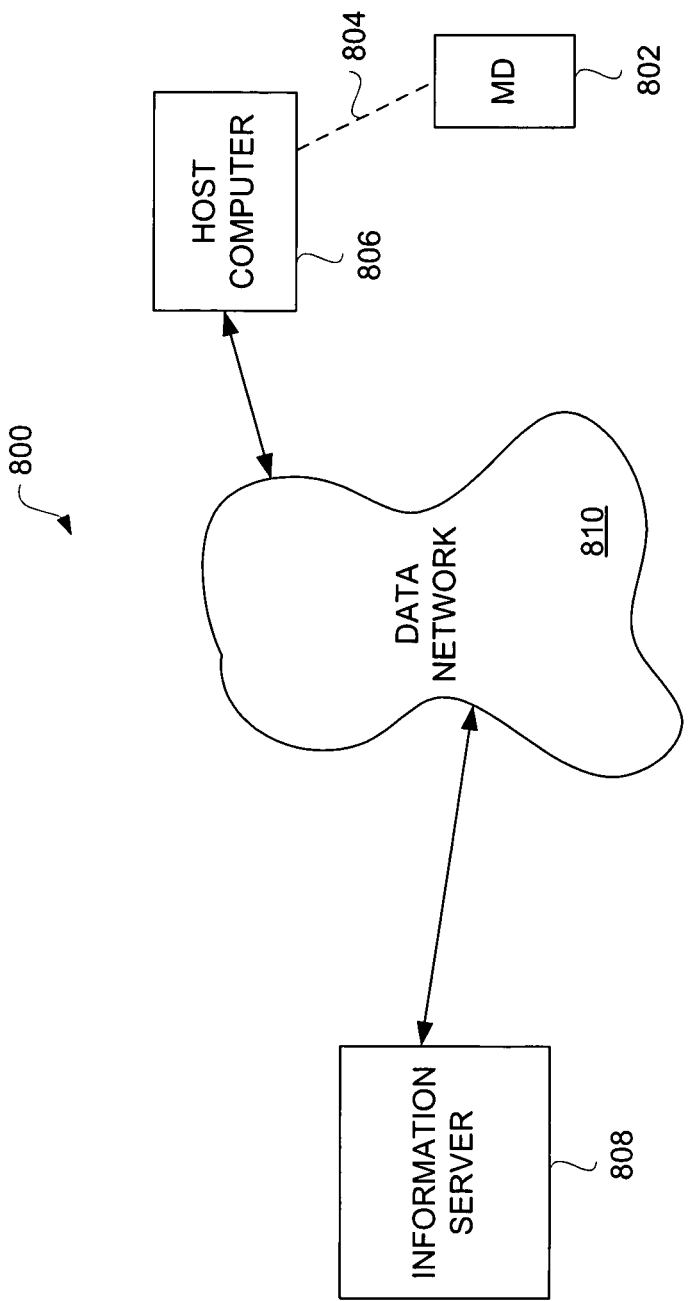
FIG. 8 is a block diagram of a location monitoring system according to one embodiment of the invention.

FIG. 8 is a block diagram of a location monitoring system 800 according to one embodiment of the invention. The location monitoring system 800 operates to monitor the locations of various different mobile devices and then provide to users information related to the locations.

The location monitoring system 800 includes a mobile device 802. The mobile device 802 is representative of numerous different types of mobile electronic devices that can be utilized in the location monitoring system 800. In one embodiment, the mobile device 802 has a location determining module so that it can determine its location. As one example, the location determining module can include at least a global positioning system (GPS) receiver. In another embodiment, the location determining module can include wireless communication circuitry to determine or assist in the determination of the location of the mobile device 802.

The location monitoring system 800 can also include a host computer 806. The host computer 806 is typically affiliated with one or more mobile devices (e.g., mobile device 802) that are used by the same or affiliated user. A link 804 can be established between the mobile device 802 and the host computer 806. The link 804 can correspond to a wired or wireless data connection that can be established between the mobile device 802 and the host computer 806. For example, a particular user might have a mobile device that is used during the day while away from home, and then in the evening the user returns to home where the user has a home computer (i.e., host computer). In such an example, the mobile device can link to the home computer when the mobile device and home computer are both at the home.

The location monitoring system 800 can also include an information server 808 and a data network 810. The data network 810 can pertain to a network of one or more networks, whether wired or wireless, that are used to provide a data link between the host computer 806 and the information server 808. The information server 808 can provide location dependent information to requesters. For example, the requesters can be the host computer 806 or the mobile device 802.

More particularly, in one embodiment, the mobile device 802 operates to record its location over a period of time. Then, when the mobile device 802 connects to the host computer 806 via the link 804, the location information acquired by the mobile device 802 can be sent to the host computer 806 via the link 804. The host computer 806 can then process the location information to produce location data. The degree of processing of the location information can vary. For example, the processing can merely organize the location information, or the processing can perform at least some analysis on the location information.

The location data can then be sent to the information server 808 along with a request for information that pertains to the location data. The information server 808 can operate to satisfy the request for data in view of the location data by returning appropriate location-specific information to the host computer 806. The host computer 806 can store the location-specific information and/or can present some or all of the location-specific information at the host computer 806. In addition, the host computer 806 can send the location-specific information to the mobile device 802. Thereafter, the mobile device 802 can store the location-specific information. At some point, the mobile device 802 can present some or all of the location-specific information. In this regard, the location-specific information being presented at the mobile device 802 and/or the host computer 806 can depend upon the location or locations for which the mobile device 802 was used. The presentment of the location-specific information at the host computer 806 or the mobile device 802 can be visual and/or audio. As one example, presentment of the location-specific information at the host computer 806 or the mobile device 802 can cause display of the location-specific information on a display of the host computer 802 of the mobile device 802. As another example, presentment of the location-specific information at the host computer 806 or the mobile device 802 can cause playback of an audio rendition of the location-specific information at the host computer 802 of the mobile device 802.

In another embodiment, the data network 810 (e.g., a wireless network) can record the location of the mobile device 802 over a period of time using wireless signals (e.g., triangulation techniques or signal strength). The locations can be stored remotely by an apparatus coupled to the data network 810. Optionally or alternatively, the mobile device 802 and/or the host computer 806 can store the locations.

The locations (or location information) can be processed to produce location data. When location-specific information is to be provided, the location data can be sent to the information server 808 along with a request for information that pertains to the location data. The information server 808 can further process the location data, such as analyzing the locations, types of locations, or frequency of locations. The information server 808 can then operate to satisfy the request for information in view of the location data and return appropriate location-specific information to the requester. The host computer 806 can store the location-specific information and/or can present some or all of the location-specific information at the host computer 806. In addition, the host computer 806 can send the location information to the mobile device 802. Thereafter, the mobile device 802 can present some or all of the location information. In this regard, the location information being presented at the mobile device 802 and/or the host computer 806 can depend upon the location or locations for which the mobile device 802 was used. The location information can be digital content pertaining to the location or locations. The location information can pertain to rewards or recommendations. A recommendation can be determined based on at least the location or locations.

As noted above, the location of the mobile device 802 can be determined by or with the assistance of a location determining module provided with a mobile device. When the location determining module includes wireless communication circuitry, the mobile device is able to interact with one or more wireless networks to determine or assist in determining its location. For example, the wireless network can be a cellular network which is able to provide approximate location of a mobile device. In this example, the location is determined by the cellular network using the wireless communication capabilities of the mobile device. As another example, the wireless network can be a WiFi network and given the limited range of a WiFi hotspot, the location of the mobile device can be correlated to the location of the WiFi hotspot when the mobile device is able to connect to the WiFi hotspot.

Figure 9:
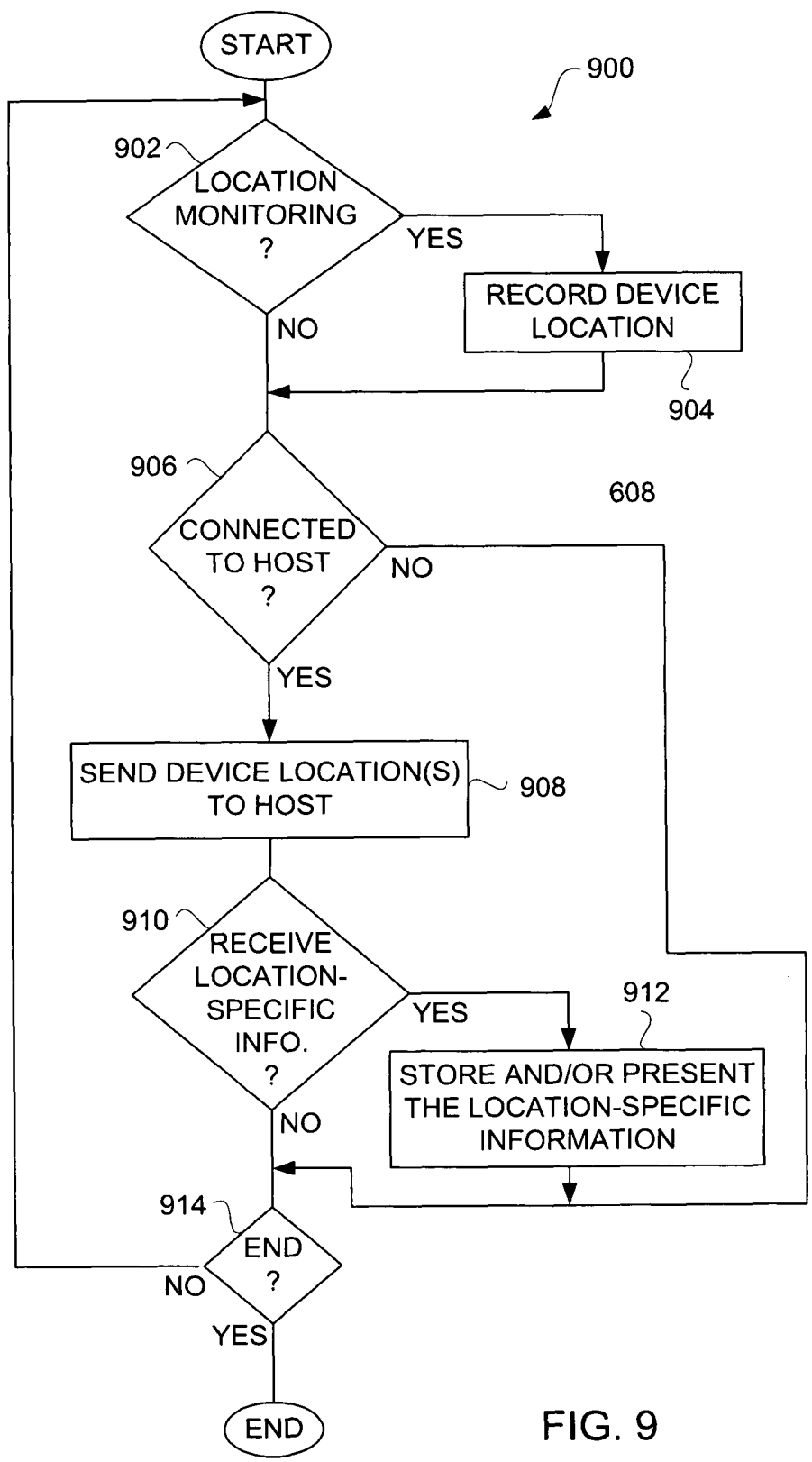
FIG. 9 is a flow diagram of a location monitoring and presentment process according to one embodiment of the invention.

FIG. 9 is a flow diagram of a location monitoring and presentment process 900 according to one embodiment of the invention. The location monitoring and presentment process 900 is, for example, performed by a mobile device, such as the mobile device 802 illustrated in FIG. 8.

The location monitoring and presentment process 900 can begin with a decision 902. The decision 902 can determine whether location monitoring is to be provided or performed at the mobile device. In one implementation, location monitoring can be controlled by device configuration, user preference, user profile, or by a system configuration. When the decision 902 determines that location monitoring is to be performed, then a device location for the mobile device can be recorded 904. In one implementation, the device location can be periodically recorded 904 when location monitoring is being performed (i.e., enabled).

Following the block 904, or directly following the decision 902 when location monitoring is not to be performed, a decision 906 can determine whether the mobile device is connected to a host device (e.g., host computer 806). When the decision 906 determines that the mobile device is connected to the host device, one or more device locations that have been previously recorded (or acquired) are sent 908 the host device. In this embodiment, the mobile device acquires the location information (e.g., via its location determining module). A decision 910 can then determine whether location-specific information has been received at the mobile device. When the decision 910 determines that location-specific information has been received, the location-specific information can be stored in or presented 912 at the mobile device.

Following the block 912 or following the decision 910 directly when location-specific information is not received, a decision 914 can determine whether the location monitoring and presentment process 900 should end. The decision 914 can also be performed following the decision 906 when the mobile device is not connected to the host device. In any case, when the decision 914 determines that the location monitoring and presentment process 900 should not end, the location monitoring and presentment process 900 can return to repeat the decision 902 and subsequent blocks. Alternatively, when the decision 914 determines that the location monitoring and presentment process 900 should end, then the location monitoring and presentment process 900 can end.

As noted above, the location monitoring can yield location-based information or location-specific information. In general, location-based information or location-specific information is information (e.g., data) relevant to monitored locations. This information (e.g., data) can be presented in a visual and/or audio manner. The information (e.g., data) can also be structured data that is further processed (e.g., locally) before being presented. By providing location-based information or location-specific information, a mobile device is able to better support its user and thus offer an improved user experience with the mobile device.

In one embodiment, the location-specific information can be a coupon or menu for a business (e.g., restaurant). The coupon or menu can then be locally stored and rapidly presented on the mobile device. In one implementation, the menu or coupon can be presented on the mobile device when the mobile device later is nearby the corresponding business. In another embodiment, the location-specific information can be predicted from the monitored locations of a mobile device. For example, if the user (and the mobile device) frequent a particular business or type of business, the location-specific information can be relevant to the particular business or type of business.

In another embodiment, the location-specific information can provide a recommendation to a user of the mobile device. For example, if the user frequents a coffee shop during weekday mornings, the location-specific information can recommend a new coffee shop or a more convenient coffee shop. For example, a coffee shop at a location more convenient to another location that the user (and the mobile device) frequent, such as work, school, etc., can be recommended. The recommendation can also suggest to the user with a single location that could be visited in place of two separate different locations that the user stops. For example, if the user often stops for coffee at a coffee store and also makes a separate stop at a donut store that is at a different location, the system can recommend a single location that would be more convenient for the user. The recommendations can take into consideration the user's normal geographical area.

Figure 10:
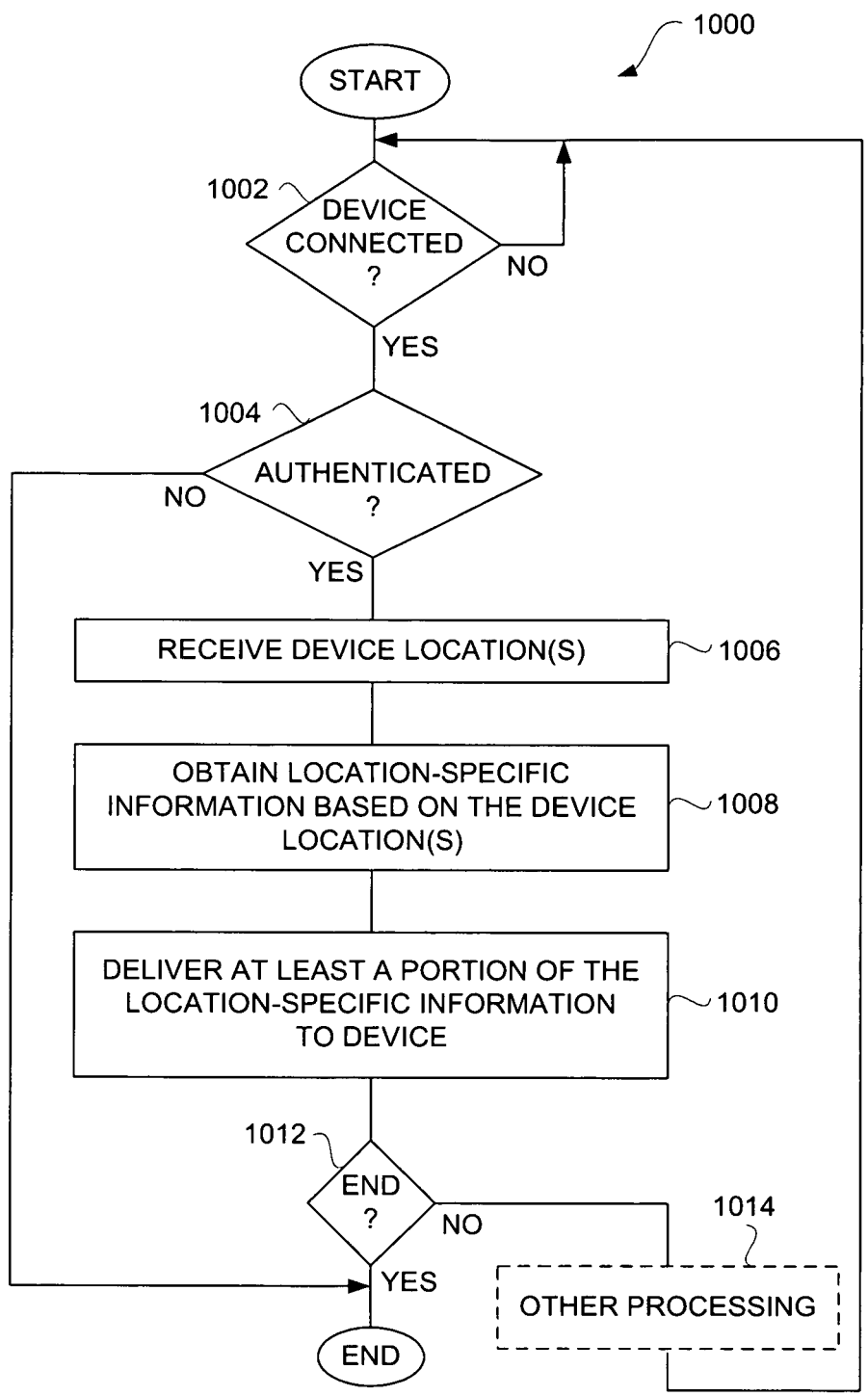
FIG. 10 is a flow diagram of an information retrieval process according to one embodiment of the invention.

FIG. 10 is a flow diagram of an information retrieval process 1000 according to one embodiment of the invention. The information retrieval process 1000 is, for example, performed by a host device, such as the host computer 806 illustrated in FIG. 8.

The information retrieval process 1000 can began with a decision 1002. The decision 1002 can determine whether a device is connected to a host device. When the decision 1002 determines that the mobile device is not connected to a host device, the information retrieval process 1000 awaits such a connection and can, if desired, perform other unrelated processing (not shown). On the other hand, once the decision 1002 determines that a connection has been made, an authentication decision 1004 can determine whether the mobile device it is able to be authenticated to the host device. When the decision 1004 determines that authentication has not been successful, the information retrieval process 1000 is not able to be further performed so the information retrieval process 1000 can end.

On the other hand, when the decision 1004 determines that the mobile device is authenticated, the host device can receive 1006 device locations that have been acquired by the corresponding mobile device. Next, location-specific information can be obtained 1008 based on the device locations. The location-specific information can be obtained 1008 either locally at the host device or remotely from an information server, such as the information server 808. After the location-specific information has been obtained 1008, at least a portion of the location-specific information can be delivered 1010 to the corresponding mobile device.

Next, a decision 1012 determines whether the information retrieval process 1000 should end. When the decision 1012 determines that the information retrieval process should not end, then other processing 1014 can be optionally performed. The other processing 1014 is dependent upon implementation and/or applications supported by the mobile device. Following the other processing 1014 (if any), the information retrieval process 1000 can return to repeat the decision 1002 so that the information retrieval processing 1000 can be performed when a device connects to the host device. On the other hand, when the decision 1012 determines that the information retrieval process 1000 is to end, then the information retrieval process 1000 can end.

Figure 11:
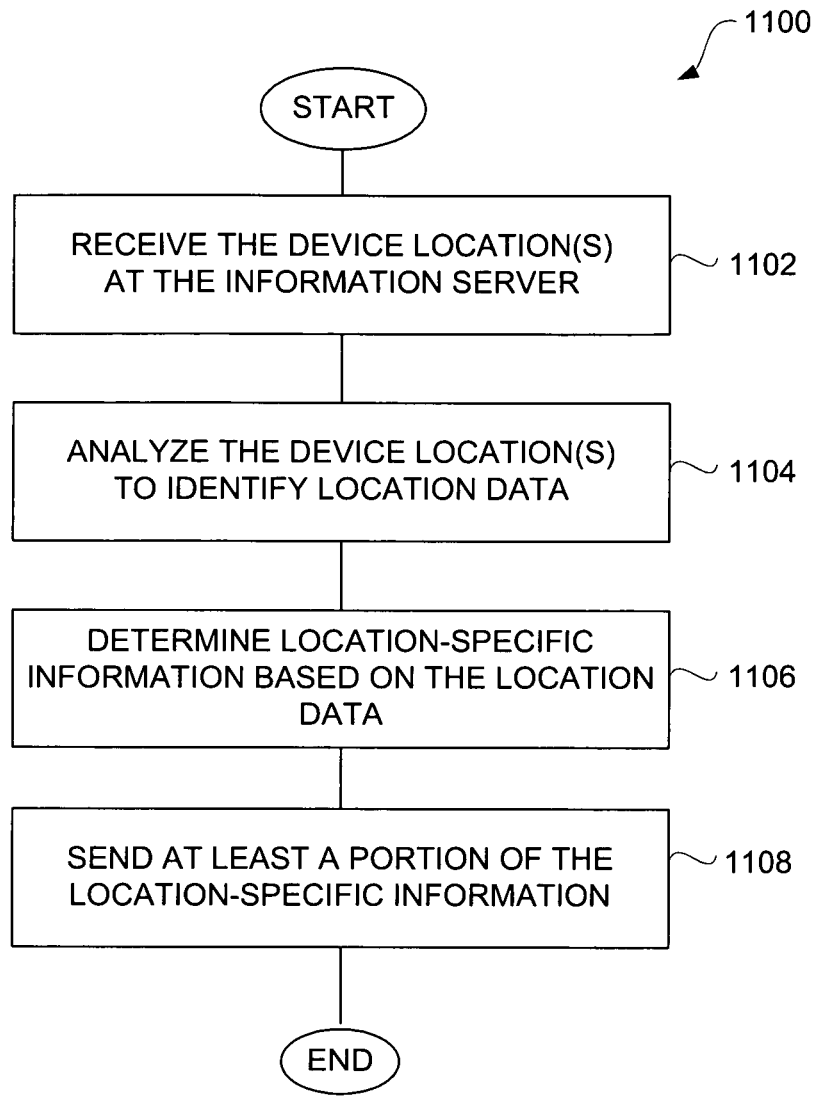
FIG. 11 is a flow diagram of a location-specific information process according to one embodiment of the invention.

FIG. 11 is a flow diagram of a location-specific information process 1100 according to one embodiment of the invention. The location-specific information process 1100 is, for example, performed by an information server.

The location-specific information process 1100 can receive 1102 the device locations at the information server from a requestor (host computer or mobile device). Typically, as noted above, the device locations are provided to the information server by a host computer via a data network. Alternatively, in another embodiment, a mobile device can provide the device locations to the information server without using a host computer as an intermediary. Next, the device locations can be analyzed 1104 to identify the location data. For example, the location data can pertain to a set of locations for the mobile device. Next, location-specific information can be determined 1106 based on at least the location data. Thereafter, at least a portion of the location-specific information is sent 1108 from the information server to the requestor.

As noted above, the location-specific information process 1100 can be performed by an information server. However, in an alternative embodiment, similar processing can be performed by the host device, such as at block 1008 of the information retrieval process 1000 illustrated in FIG. 10. In another embodiment, location-specific information process 1100 can be partially perform by an information server and partially performed by a host device.

The nature, characteristics or type of location-specific data can depend on the particular implementation. Location-specific data can also be provided in real-time or deferred. As one example of a real-time usage scenario, if location data indicates that a mobile device is at an airport, airport information (e.g., flight arrivals or departures) can be provided to the mobile device. An airport might provide a data feed or channel pertaining to airport information, and when the location of the mobile device is at or proximate to the airport, the data feed pertaining to airport information can be made available, received and/or displayed to the mobile device. As one example of a deferred usage scenario, if the location data indicates that a user of the mobile device frequents gyms or exercise facilities, then workout information (e.g., workout routines, training supplements, etc.) can be generally made available, received and/or displayed to the mobile device. In this example, the workout information can be received or displayed regardless of whether the mobile device is presently or recently located at a gym or exercise establishment.

Figure 12:
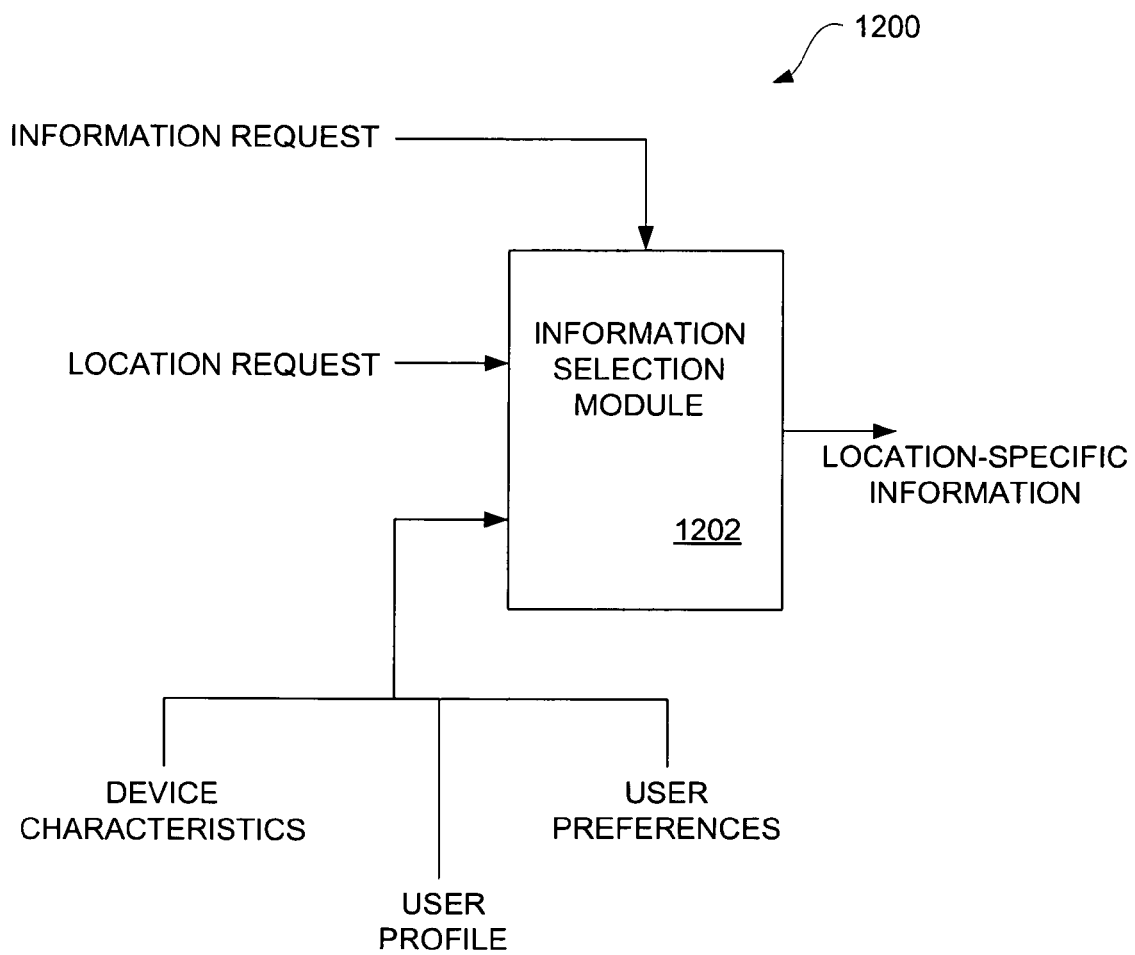
FIG. 12 is a block diagram of an information customization system according to one embodiment of the invention.

FIG. 12 is a block diagram of an information customization system 1200 according to one embodiment of the invention. The information customization system 1200 includes an information selection module 1202. The information selection module 1202 receives an information request. The information selection module 1202 can also receive location data. The location data can be provided with the information request, or the location data can be subsequently or previously provided. The information selection module 1202 is able to process the information request in view of the location data to produce location-specific information that is to be returned to the requester that has issued the information request. In one implementation, the location-specific information can be "pushed" or "pulled" with respect to the information server. As one example, the location-specific information can be a RSS feed. In another implementation, the location-specific information can be "pushed" from the information server to the mobile device. The mobile device can also "pull" the location-specific information from the information server.

The information selection module 1202 can further utilize other data in determining the location-specific information. As an example, the information selection module 1202 can make use of device characteristics associated with the mobile device, user profile of the user and/or user preferences set by the user. Device characteristics are characteristics of a mobile device. Examples of device characteristics can include screen size, screen resolution, networking capabilities, software modules/applications, etc. A user profile is a profile of a user of a device, i.e., the mobile device. The user profile represents the user. The user profile can be set manually by the user or set automatically by device. User preferences are settings in hardware or software that are set by a user. Examples of user preferences include language settings, topics of interest, geographic interests, etc.

An information server can support one or more data feeds or channels that make digital data available. A mobile device can receive one or more of the data feeds or channels. For example, an information server can offer a plurality of different data feeds or channels pertaining to different subjects, locations, times, etc. Based on a set of locations acquired by monitoring location of a mobile device, a data feed or channel of probable interest can be automatically select for a user of the mobile device. Optionally, the automatic selection can also make use of device characteristics associated with the mobile device, user profile and/or user preferences set by the user of the mobile device.

For additional information on providing information to mobile electronic devices, see U.S. application Ser. No. 11/972,570, filed concurrently herewith, and entitled "DYNAMIC DELIVERY AND PRESENTATION OF ELECTRONIC DATA TO MOBILE ELECTRONIC DEVICES," which is hereby incorporated herein by reference.

According to one embodiment, data can be delivered from an information server to a recipient device in an efficient manner. In one implementation, data being delivered can be associated with a template that is present on the recipient device. Accordingly, only data need to be transmitted to the recipient device since the format and other presentation configurations can be controlled by the template. The recipient device can be a mobile device or a host computer. For additional detail on templates, see U.S. application Ser. No. 11/899,024, filed Sep. 4, 2007, and entitled "USER INTERFACE ELEMENTS CLONING AND TRANSITIONS," which is hereby incorporated herein by reference.

The portable electronic device utilized herein can, for example, correspond to a computing device (e.g., personal computer), mobile phone (e.g., cellular phone), personal digital assistant (PDA), media player (e.g., music, videos, games, images), media storage device, camera, remote control, and/or the like. The electronic device may also be a multi-functional device that combines two or more of these device functionalities into a single device. Examples of multi-functional devices can be found in U.S. Patent Application Publication No. 20060197753, entitled "MULTI-FUNCTIONAL HAND-HELD DEVICE", which is herein incorporated by reference.

The portable electronic device utilized herein can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

Figure 13:
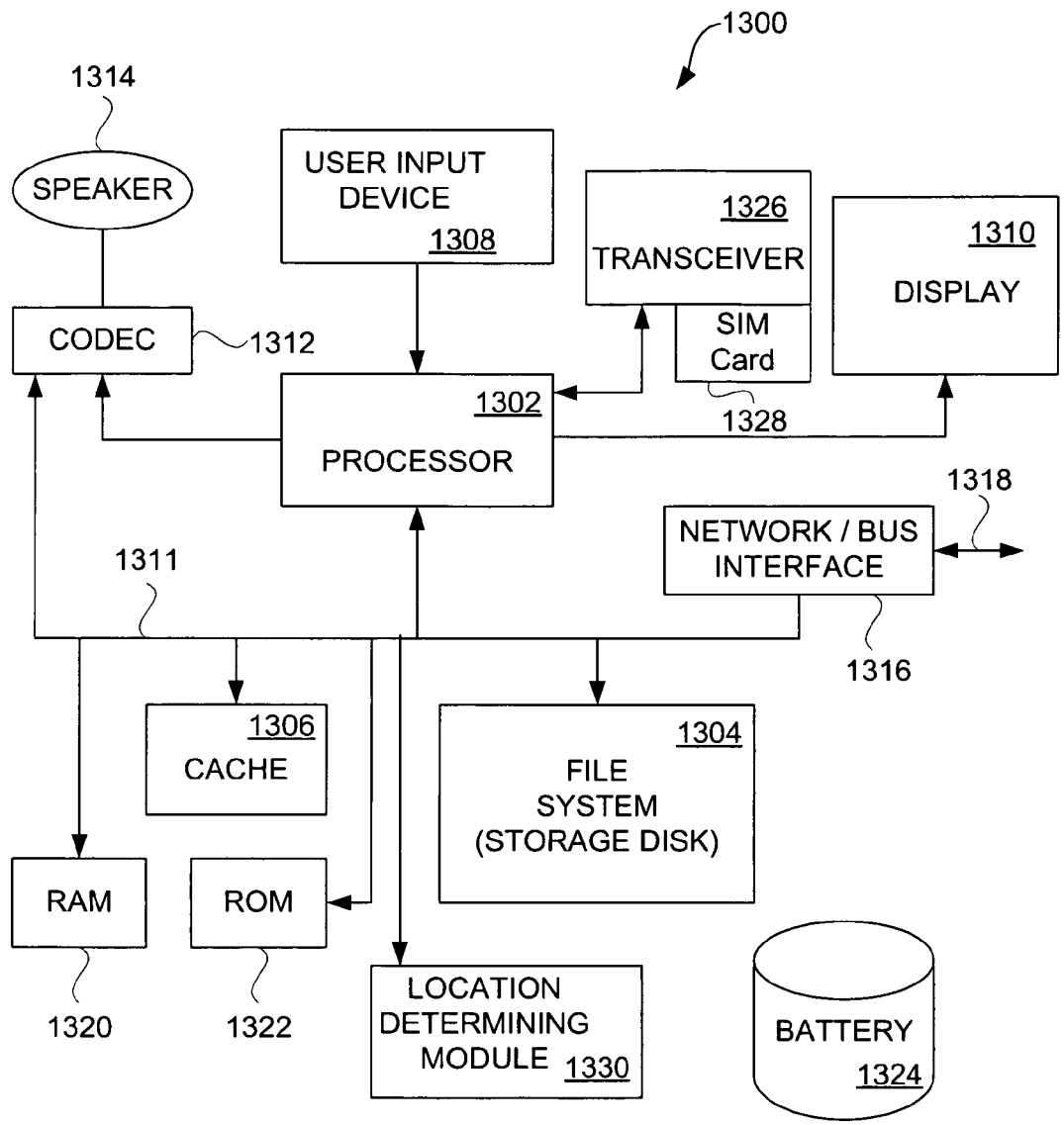
FIG. 13 is a block diagram of a mobile multi-function device according to one embodiment of the invention.

FIG. 13 is a block diagram of a mobile multi-function device 1300 according to one embodiment of the invention. The mobile multi-function device 1300 can include the circuitry of a portable electronic device that can perform the operations described above. The mobile multi-function device 1300 includes hardware and software components to provide at least two functions, namely, a media playback function (including display screen/menu presentations) and a wireless voice communications function. When providing media playback, the mobile multi-function device 1300 can operate as a media player capable of playing (including displaying) media items. The media items can, for example, pertain to audio items (e.g., audio files or songs), videos (e.g., movies) or images (e.g., photos). When providing wireless voice communications, the mobile multi-function device 1300 can operate as a mobile telephone (e.g., cellular phone).

The mobile multi-function device 1300 includes a processor 1302 that pertains to a microprocessor or controller for controlling the overall operation of the mobile multi-function device 1300. The mobile multi-function device 1300 stores media data pertaining to media items in a file system 1304 and a cache 1306. In one embodiment, the file system 1304 is implemented by a storage disk or a plurality of disks. In another embodiment, the file system 1304 is implemented by EEPROM or Flash type memory. The file system 1304 typically provides high capacity storage capability for the mobile multi-function device 1300. However, because the access time to the file system 1304 can be relatively slow, the mobile multi-function device 1300 can also include a cache 1306. The cache 1306 is, for example, Random-Access Memory (RAM) provided by semiconductor memory. The relative access time to the cache 1306 is substantially shorter than for the file system 1304. However, the cache 1306 does not have the large storage capacity of the file system 1304. Further, the file system 1304, when active, consumes more power than does the cache 1306. The power consumption is often a concern when the mobile multi-function device 1300 is a portable mobile multi-function device that is powered by a battery 1324. The mobile multi-function device 1300 also includes a RAM 1320 and a Read-Only Memory (ROM) 1322. The ROM 1322 can store programs, utilities or processes to be executed in a non-volatile manner. The ROM 1322 can be implemented by an EEPROM or Flash type memory so as to provide writable non-volatile data storage. The RAM 1320 provides volatile data storage, such as for the cache 1306.

In one embodiment, to support wireless voice communications, the mobile multi-function device 1300 includes a transceiver 1326 and a SIM card 1328. The transceiver 1326 supports wireless communication with a wireless network (such as a wireless cellular network). The SIM card 1328 includes an identifier (e.g., SIM identifier) can be used by the mobile multi-function device 1300 to gain access and utilize the wireless network. In other embodiments, a SIM card 1328 is not utilized.

The mobile multi-function device 1300 also includes a user input device 1308 that allows a user of the mobile multi-function device 1300 to interact with the mobile multi-function device 1300. For example, the user input device 1308 can take a variety of forms, such as a button, keypad, dial, etc. Still further, the mobile multi-function device 1300 includes a display 1310 (screen display) that can be controlled by the processor 1302 to display information to the user. A data bus 1311 can facilitate data transfer between at least the file system 1304, the cache 1306, the processor 1302, and the CODEC 1312.

In one embodiment, the mobile multi-function device 1300 serves to store a plurality of media items (e.g., songs, movies, etc.) in the file system 1304. When a user desires to have the mobile multi-function device play a particular media item, a list of available media items is displayed on the display 1310. Then, using the user input device 1308, a user can select one of the available media items. The processor 1302, upon receiving a selection of a particular media item, supplies the media data (e.g., audio file) for the particular media item to a coder/decoder (CODEC) 1312. The CODEC 1312 then produces analog output signals for a speaker 1314. The speaker 1314 can be a speaker internal to the mobile multi-function device 1300 or external to the mobile multi-function device 1300. For example, headphones or earphones that connect to the mobile multi-function device 1300 would be considered an external speaker.

The mobile multi-function device 1300 also includes a bus interface 1316 that couples to a data link 1318. The data link 1318 allows the mobile multi-function device 1300 to couple to a host device (e.g., host computer or power source). The data link 1318 can also provide power to the mobile multi-function device 1300.

Still further, the mobile multi-function device 1330 can include a location determining module 1330. The location determining module 1330 can determine or assist in determining the location of the mobile multi-function device 1300. As one example, the location determining module 1330 can include at least a global positioning system (GPS) receiver. In another embodiment, the location determining module 1330 can include wireless communication circuitry to determine or assist in the determination of the location of the mobile multi-function device 1300. For example, the location determining module 1330 can use, incorporate or integrate some or all of the transceiver 1326.

The digital media assets (i.e., digital media items) can pertain to video items (e.g., video files or movies), audio items (e.g., audio files or audio tracks, such as for songs (music), podcasts or audiobooks), or image items (e.g., photos).

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that a mobile electronic device can be monitored so that digital content relevant to its usage or location can be automatically delivered (or made available) to the mobile electronic device. Another advantage of the invention is that loyal (i.e., repeat) patrons to establishments can be better understood and rewarded for their patronage. Still another advantage of the invention is that digital content can be dynamically provided or made available to a mobile electronic device based on a current location of the mobile electronic device and/or former locations of the mobile electronic device.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for providing patrons with rewards, said method comprising:
   detecting, by a server, presence of a mobile electronic device at a particular establishment;
   updating, by the server, presence indicator data regarding the particular establishment when said detecting detects the presence of the mobile electronic device at the particular establishment;
   obtaining one or more reward rules associated with the particular establishment; and
   determining, by the server, whether a reward is due to the mobile electronic device or a user of the mobile electronic device based on the presence indicator data and the one or more reward rules.

2. A method as recited in claim 1, wherein the presence indicator data is a count of a number of times the mobile electronic device has been at the particular establishment.

3. A method as recited in claim 2, wherein said updating increases the count for the mobile electronic device when said detecting detects the presence of the mobile electronic device at the particular establishment.

4. A method as recited in claim 1, wherein the presence indicator data is a count of a number of times the mobile electronic device has visited the particular establishment.

5. A method as recited in claim 1, wherein said determining whether the reward is due comprises:
   determining whether any of the one or more reward rules are applicable; and
   determining the reward due based on those of the one or more reward rules that are determined to be applicable.

6. A method as recited in claim 1, wherein said method further comprises:
   delivering, by the server, the reward to the mobile electronic device or the user when said determining determines that a reward is due.

7. A method as recited in claim 1, wherein said method further comprises:
   queuing, by the server, the reward for subsequent delivery to the mobile electronic device or
another device associated with the user of the mobile electronic device when said determining determines that a reward is due.

8. A method for rewarding patrons for device usage at particular locations, said method comprising:
   monitoring, by a server, device usage at one or more of the particular locations to accumulate
device usage information, the accumulated device usage information being separately provided with respect to the particular locations;
   determining, by the server, whether a reward is due based on the accumulated device usage information; and
   delivering, by the server, a reward to the device or a user of the mobile electronic device when said determining determines that a reward is due.

9. A method as recited in claim 8, wherein the device is a mobile electronic device, and wherein the accumulated device usage information comprises a count of a number of time the mobile device has been at each of the particular locations.

10. A method as recited in claim 8, wherein said determining determines that a reward is due based on the accumulated device usage information for a particular location.

11. A method as recited in claim 8, wherein the reward determined to be due is dependent on at least one reward rule associated with a particular location.

12. A method as recited in claim 11, wherein the particular location is a location of an establishment.

13. A method as recited in claim 12, wherein the reward is associated with the establishment.

14. A method as recited in claim 8, wherein the reward is provided or available at one of the particular locations.

15. A method as recited in claim 14,
   wherein the particular location is a location of an establishment, and
   wherein the reward determined to be due is dependent on at least one reward rule associated with the establishment.

16. A non-transitory computer readable medium including a computer program code stored thereon that when executed by a computer provides patrons with rewards, said computer readable medium comprising:
   computer program code that detects the presence of a mobile electronic device at a particular establishment;
   computer program code that updates presence indicator data regarding the particular establishment when said detecting detects the presence of the mobile electronic device at the particular establishment;
   computer program code that executes one or more reward rules associated with the particular establishment; and
   computer program code that determines whether a reward is due to the mobile electronic device or a user of the mobile electronic device based on the presence indicator data and one or more reward rules.

17. A non-transitory computer readable medium as recited in claim 16, wherein the presence indicator data is a count of a number of times the mobile electronic device has been at the particular establishment.

18. A non-transitory computer readable medium as recited in claim 16, wherein said computer program code that updates also increases the count for the mobile electronic device when said detecting detects the presence of the mobile electronic device at the particular establishment.

19. A non-transitory computer readable medium as recited in claim 16, wherein the presence indicator data is a count of a number of times the mobile electronic device has visited the particular establishment.

20. A non-transitory computer readable medium as recited in claim 16, wherein said computer program code that determines whether the reward is due comprises:
   computer program code that determines whether any of the one or more reward rules are applicable; and
   computer program code that determines the reward due based on those of the one or more reward rules that are determined to be applicable.

21. A non-transitory computer readable medium as recited in claim 16, wherein said computer readable medium further comprises:
   computer program code that delivers the reward to the mobile electronic device or the user when the computer determines that a reward is due.

22. A non-transitory computer readable medium as recited in claim 16, wherein said computer readable medium further comprises:
   computer program code that queues the reward for subsequent delivery to the mobile electronic device or another device associated with the user of the mobile electronic device when said determining determines that a reward is due.

23. A non-transitory computer readable medium including at least computer program code stored therein for executing bỿ a computer system to reward rewarding patrons for device usage at particular locations, said computer readable medium comprising:

computer program code for monitoring device usage at one or more of the particular locations to accumulate device usage information, the accumulated device usage information being separately provided with respect to the particular locations;

computer program code for determining whether a reward is due based on the accumulated device usage information; and computer program code for delivering a reward to the device or a user of the mobile electronic device if when said determining determines that a reward is due.

24. A non-transitory computer readable medium as recited in claim 23, wherein the device is a mobile electronic device, and wherein the accumulated device usage information comprises a count of a number of time the mobile device has been at each of the particular locations.

25. A non-transitory computer readable medium as recited in claim 23, wherein said computer program code determines that a reward is due based on the accumulated device usage information for a particular location.

26. A non-transitory computer readable medium as recited in claim 23, wherein the reward determined to be due is dependent on at least one reward rule associated with a particular location.

27. A non-transitory computer readable medium as recited in claim 26, wherein the particular location is a location of an establishment.

28. A non-transitory computer readable medium as recited in claim 27, wherein the reward is associated with the establishment.

29. A non-transitory computer readable medium as recited in claim 23, wherein the particular location is a location of an establishment, and wherein the reward determined to be due is dependent on at least one reward rule associated with the establishment.

* * * * *

UNITED STATES PATENT AND TRADEMARK OFFICE
CERTIFICATE OF CORRECTION

PATENT NO. : 8,548,925 B2
APPLICATION NO. : 12/014552
DATED : October 1, 2013
INVENTOR(S) : William E. Bull et al.

Page 1 of 1

It is certified that error appears in the above-identified patent and that said Letters Patent is hereby corrected as shown below:

In the Claims

Column 19, Line 6, Claim 23: please delete "b¥" and insert --by--.

Column 19, Line 6, Claim 23: please delete "rewarding".

Column 19, Line 18, Claim 23: please delete "if".

Signed and Sealed this
Fifth Day of November, 2013

Teresa Stanek Rea
*Deputy Director of the United States Patent and Trademark Office*